United States Patent
Chen (10) Patent No.: US 10,727,677 B2
(45) Date of Patent: Jul. 28, 2020

(54) FAST CHARGING CIRCUIT

(71) Applicant: ANPEC ELECTRONICS CORPORATION, Hsinchu (TW)

(72) Inventor: Chih-Ning Chen, Taipei (TW)

(73) Assignee: APNEC ELECTRONICS CORPORATION, Hsinchu (TW)

(*) Notice: Subject to any disclaimer, the term of this patent is extended or adjusted under 35 U.S.C. 154(b) by 333 days.

(21) Appl. No.: 15/943,782

(22) Filed: Apr. 3, 2018

(65) Prior Publication Data

US 2019/0222047 A1    Jul. 18, 2019

(30) Foreign Application Priority Data

Jan. 17, 2018  (TW) ............................... 107101699 A (51) Int. Cl.
*H02J 7/00* (2006.01)
*H02J 7/04* (2006.01)

(52) U.S. Cl.
CPC .............. *H02J 7/00* (2013.01); *H02J 7/0068* (2013.01); *H02J 7/007184* (2020.01); *H02J 7/045* (2013.01); *H02J 2207/10* (2020.01)

(58) Field of Classification Search
CPC ...... H02J 7/00; H02J 7/007184; H02J 7/0068; H02J 7/045; H02J 2207/10

USPC ......................................................... 320/162
See application file for complete search history.

(56) References Cited

U.S. PATENT DOCUMENTS

| | | | |
|---|---|---|---|
| 2015/0042164 A1* | 2/2015 | Oh ........................ | H02J 7/0068 307/38 |
| 2016/0064986 A1* | 3/2016 | Langlinais ............ | H02J 7/0078 320/134 |
| 2016/0380455 A1* | 12/2016 | Greening ............... | H02M 3/158 320/114 |

* cited by examiner

*Primary Examiner* — Nathaniel R Pelton
(74) *Attorney, Agent, or Firm* — Li & Cai Intellectual Property (USA) Office (57) ABSTRACT

A fast charging circuit includes a switching charger and a first bypass charging circuit. The input end of the switching charger receives an input voltage, and the output end of the switching charger is coupled to a battery through a first switch and is coupled to a system terminal. The first bypass charging circuit includes a second switch between its input end and output end. The input end of the first bypass charging circuit receives the input voltage, and the output end of the first bypass charging circuit is coupled to the system terminal through the first switch and is coupled to the battery. When the voltage of the battery is low, the first switch is turned on and the second switch is turned off, but when the voltage of the battery is high, the second switch and the third switch are turned on.

10 Claims, 5 Drawing Sheets

FAST CHARGING CIRCUIT

BACKGROUND OF THE INVENTION

1. Field of the Invention

The present disclosure relates to a charging circuit; in particular, to a fast charging circuit.

2. Description of Related Art

In recent years, people are relying more and more on various portable electronic devices, such as mobile phones, laptops, tablets or other portable electronic devices that bring convenience to their lives and workplaces. Charging technologies have undergone rapid development to cope with user needs. A fast-charging technology has recently been introduced to provide frequent users of portable electronic devices with a shorter charging time.

Generally speaking, for faster charging of a battery, the charging current needs to be raised in the charging process. Specifically, in the charging process, when the voltage of the battery is low, it would not be appropriate to charge the battery with a high current. However, when the voltage of the battery reaches a threshold voltage, the charging current will be raised for charging the battery faster until the battery is charged to its full battery voltage. While in this manner, the battery can be charged faster, there are also certain defects associated therewith.

Since circuit elements of a charging circuit have their impedances, an increase of the charging current would result in an increase of power loss caused by the circuit elements, which lowers the charging efficiency of the charging circuit. Moreover, the increase of the charging current during the time when the voltage of the battery is raised from the threshold voltage to the full battery voltage would cause a temperature of the battery to increase, which in turn may cause the electronic device to overheat.

SUMMARY OF THE INVENTION

To overcome the above disadvantages, the present disclosure provides a fast charging circuit. By using the fast charging circuit, when a battery is charged in a fast charging process, there will be much less power loss and a better charging efficiency.

The fast charging circuit provided by the present disclosure includes a switching charger and a first bypass charging circuit. The switching charger has an input end and an output end. The input end of the switching charger receives an input voltage, and the output end of the switching charger is coupled to a battery through a first switch and is coupled to a system terminal. The first bypass charging circuit has an input end and an output end. The first bypass charging circuit includes a second switch between its input end and its output end. The input end of the first bypass charging circuit receives the input voltage, and the output end of the first bypass charging circuit is coupled to the system terminal through the first switch and is coupled to the battery.

In one embodiment of the fast charging circuit provided by the present disclosure, when the voltage of the battery is low, the first switch is turned on and the second switch is turned off such that the battery is charged through the switching charger and the system terminal receives power from the switching charger. One the other hand, when the voltage of the battery is high, the second switch and the third switch are turned on such that the battery is charged through the first bypass charging circuit and the system terminal receives power from the first bypass charging circuit.

When a battery is charged by the fast charging circuit provided by the present disclosure, the battery can receive power from a first bypass charging circuit having less impedance in a fast charging process (i.e. before the voltage of the battery is charged to its full battery voltage). Therefore, in the fast charging process, there will be much less power loss and a better charging efficiency.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

[One embodiment of the fast charging circuit]

Figure 1:
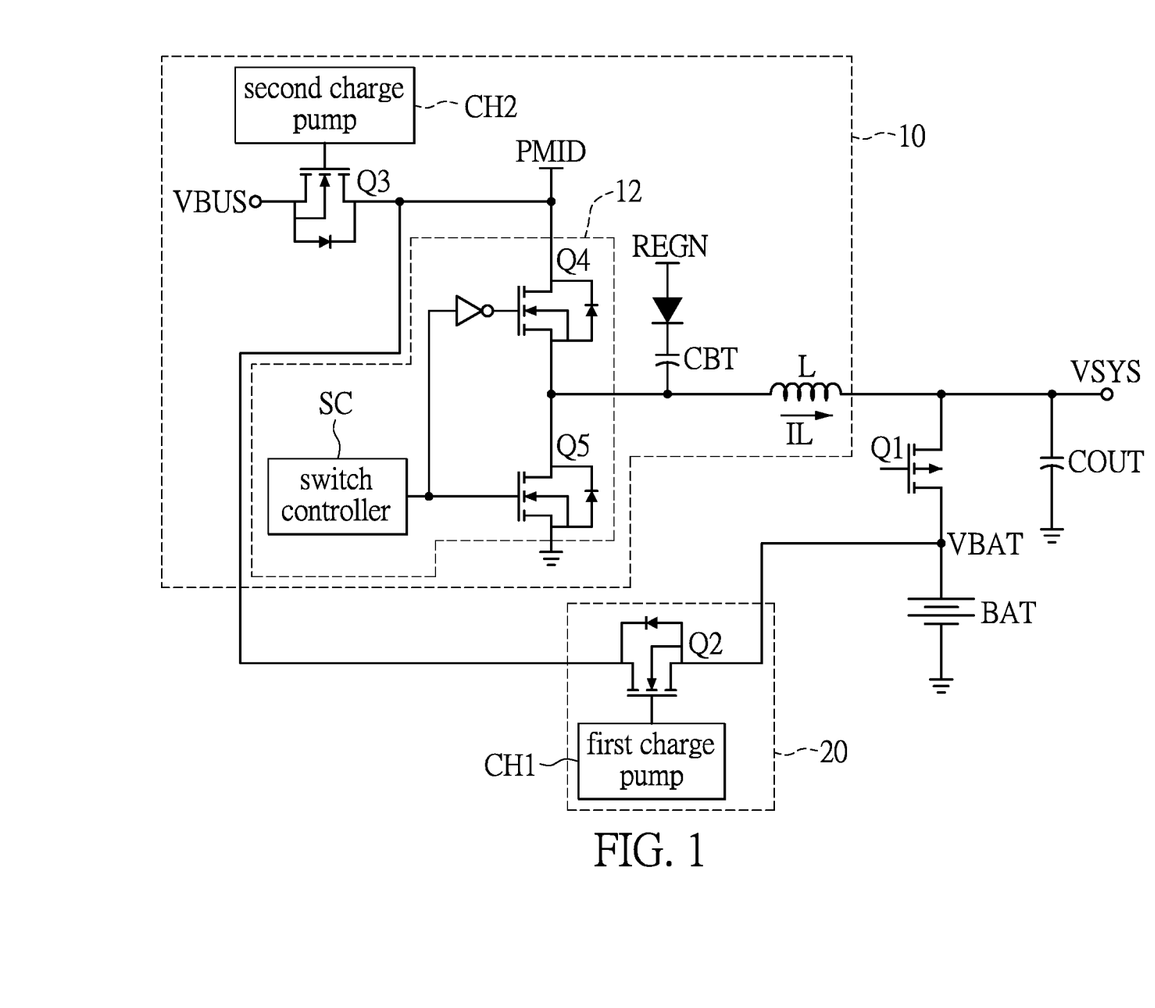
FIG. 1 shows a circuit diagram of a fast charging circuit according to one embodiment of the present disclosure.

Referring to FIG. 1, a circuit diagram of a fast charging circuit according to one embodiment of the present disclosure is shown.

As shown in FIG. 1, the fast charging circuit provided by this embodiment includes a switching charger 10 and a first bypass charging circuit 20. The switching charger 10 has an input end and an output end. The input end of the switching charger 10 receives an input voltage VBUS, and the output end of the switching charger 10 is coupled to a battery BAT through a first switch Q1 and is coupled to a system terminal VSYS. The first bypass charging circuit 20 includes a second switch Q2. The second switch Q2 is coupled between the input end and the output end of the first bypass charging circuit 20. The input end of the first bypass charging circuit 20 receives the input voltage VBUS, and the output end of the first bypass charging circuit 20 is coupled to the system terminal VSYS through the first switch Q1 and is coupled to the battery BAT.

The working principle of the fast charging circuit is illustrated in the following descriptions. When the voltage of the battery is low, it would not be appropriate to charge the battery BAT with a high current. Thus, when the voltage of the battery is low, the first switch Q1 is turned on and the second switch Q2 is turned off, such that the battery BAT is charged through the switching charger 10, and the system terminal VSYS also receives power from the switching charger 10. On the other hand, when the voltage of the battery is high, the second switch Q2 and the third switch Q3 are turned on, such that the battery BAT is charged to its full battery voltage through the first bypass charging circuit 20, and the system terminal VSYS also receives power from the first bypass charging circuit 20. It should be noted that, for different types of batteries, there are different threshold points between the switch charging mode and the fast charging mode. Also, different types of batteries have different full battery voltages. For example, for one type of battery, the threshold point between the switch charging mode and the fast charging mode can be 3.6V and the full battery voltage can be 4.2V but it is not limited thereto.

In other words, in this embodiment, when the battery BAT is charged at a normal speed when the voltage VBAT of the battery BAT is low (i.e. in the switch charging mode), only the switching charger 10 works to charge the battery BAT and provide power to the system terminal VSYS. On the other hand, when the battery BAT is charged at a faster speed when the voltage VBAT of the battery BAT is high (i.e. in the fast charging mode), only the first bypass charging circuit 20 and the third switch Q3 work to charge the battery BAT and provide power to the system terminal VSYS.

According to FIG. 1, compared with the switching charger 10, the first bypass charging circuit 20 has less impedance. Thus, when the battery BAT is charged at a faster speed, a higher current can be provided to the battery BAT and the system terminal VSYS through the first bypass charging circuit 20 without increasing power loss.

In the fast charging circuit provided by this embodiment, the switching charger 10 at least includes a third switch Q3 and a switch circuit 12. The switch circuit 12 is coupled to the input end of the switching charger 10 through the third switch Q3 to receive the input voltage VBUS and correspondingly provide an output voltage to the battery BAT and the system terminal VSYS through an inductor L.

In the following descriptions, circuit elements and configuration of the switching charger 10 and the first bypass charging circuit 20 are illustrated.

In the switching charger 10, the switching circuit 12 includes a fourth switch Q4, a fifth switch Q5 and a switch controller SC. The voltage required by the switching charger 10 is provided by the supply voltage PMID. The first end of the fourth switch Q4 is coupled to the input end of the switching charger 10 through the third switch Q3, the second end of the fourth switch Q4 is coupled to the first end of the fifth switch Q5 and is coupled to the output end of the switching charger 10 through the inductor L, and the second end of the fifth switch Q5 is grounded. In addition, the switch controller is coupled to the third end of the fourth switch Q4 and the third end of the fifth switch Q5.

The first switch Q1 is a PMOS transistor, with its source coupled to the system terminal VSYS, its drain coupled to the battery BAT, and its gate receiving a control voltage. The control voltage is used to control the turning on and turning off of the first switch Q1. The third switch Q3 is an NMOS transistor, with its source receiving the input voltage VBUS, its drain being coupled to the input end of the first bypass charging circuit 20, and its gate being coupled to a second charge pump CH2. The second charge pump CH2 is configured to provide sufficient voltage to turn on the third switch Q3. Additionally, the fourth switch Q4 and the fifth switch Q5 are NMOS transistors, with their first ends being drains, their second ends being sources, and their third ends being gates.

In the first bypass charging circuit 20, the second switch Q2 is an NMOS transistor, with its source being coupled to the battery BAT, its drain receiving the input voltage VBUS through the third switch Q3, and its gate being coupled to a first charge pump CH1. The first charge pump CH1 is configured to provide sufficient voltage to turn on the second switch Q2.

However, it is worth mentioning that the types of the first switch Q1, the second switch Q2, the third switch Q3, the fourth switch Q4 and the fifth switch Q5 are not limited. In other words, in other embodiments, the first switch Q1, the second switch Q2, the third switch Q3, the fourth switch Q4 and the fifth switch Q5 can be other types of transistors.

Moreover, it should be noted that in FIG. 1, a capacitor COUT is an output capacitor of the fast charging circuit. Another capacitor CBT, which receives a supply voltage REGN, is configured to provide sufficient voltage to turn on the fourth switch Q4.

According to the above circuit configuration and the working principle, if an electronic device is charged by the fast charging circuit provided by this embodiment, when the voltage VBAT of the battery BAT is low, a low current is provided by the switching charger 10 to charge the battery BAT, such that the battery BAT can be protected from damage. On the other hand, when the voltage VBAT of the battery BAT is high, a high current is provided by the first bypass charging circuit 20 to charge the battery BAT, such that the battery BAT can be charged at a faster speed. Compared with the switching charger 10, the first bypass charging circuit 20 has less impedance. Therefore, there will be much less power loss even when a high current is provided by the first bypass charging circuit 20 to charge the battery BAT, and a better charging efficiency can be maintained

[Another embodiment of the fast charging circuit]

Figure 2:
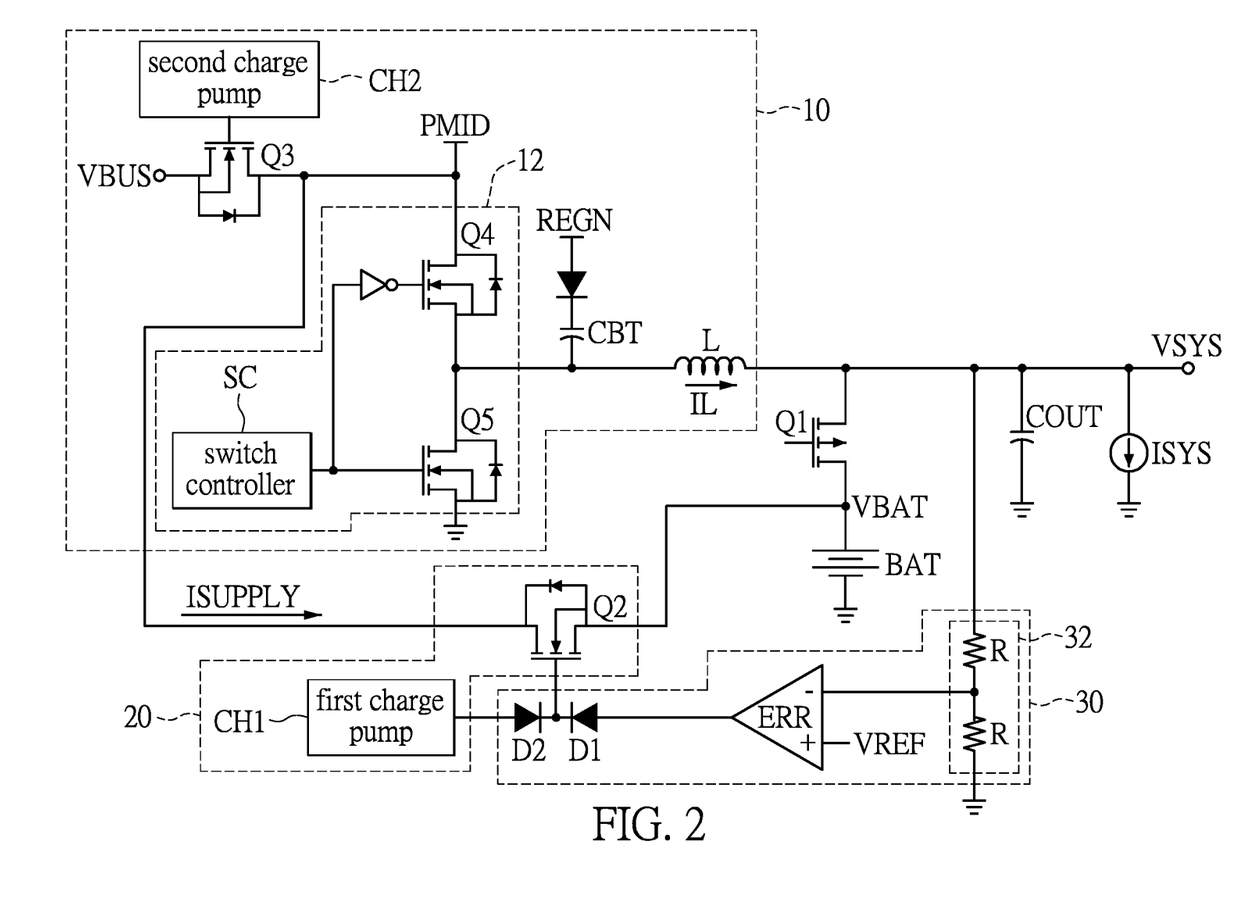
FIG. 2 shows a circuit diagram of a fast charging circuit according to another embodiment of the present disclosure.

Referring to FIG. 2, a circuit diagram of a fast charging circuit according to another embodiment of the present disclosure is shown.

The fast charging circuit provided by this embodiment and the fast charging circuit shown in FIG. 1 have similar circuit configurations and working principles. Thus, the major circuit configuration and working principle of the fast charging circuit provided by this embodiment can be referred to in the previous embodiment, and in the following descriptions, only the differences between the two embodiments are described.

The major difference between the fast charging circuit provided by this embodiment and the fast charging circuit shown in FIG. 1 is that, the fast charging circuit provided by this embodiment further includes a second bypass charging circuit 30. As shown in FIG. 2, the second bypass charging circuit 30 includes an error amplifier ERR, a first diode D1 and a second diode D2. The non-inverting input end of the error amplifier ERR receives a reference voltage VREF, and the inverting input end of the error amplifier ERR is coupled to the system terminal VSYS through a voltage dividing circuit 32. The anode of the first diode D1 is coupled to the output end of the error amplifier ERR, the anode of the second diode D2 is coupled to the first charge pump CH1, and the cathodes of the first diode D1 and the second diode D2 are coupled to the gate of the second switch Q2.

Similar to the working principle of the fast charging circuit shown in FIG. 1, in this embodiment, when the voltage VBAT of the battery BAT is low, it would not be appropriate to charge the battery BAT with a high current. Thus, when the voltage of the battery is low, the first switch Q1 is turned on and the second switch Q2 is turned off, such that the battery BAT is charged through the switching charger 10, and the system terminal VSYS also receives power from the switching charger 10. On the other hand, when the voltage of the battery is high, the second switch Q2 and the third switch Q3 are turned on, and the switch controller SC is switched off, such that the battery BAT is charged through the first bypass charging circuit 20, and the system terminal VSYS also receives power from the first bypass charging circuit 20.

In addition, the error amplifier ERR obtains a first voltage V1 relevant to the voltage of the system terminal VSYS through a voltage dividing circuit 32, and compares the first voltage V1 with the reference voltage VREF.

When a load current at the system terminal is high (i.e. a load at the system terminal VSYS requires a high current), the first voltage V1 is lower than the reference voltage VREF. For example, when an electronic device system is executing a complex application, it requires a high current. A period of time is required for the switching charger 10 to raise the current provided to the system terminal VSYS. In response, the error amplifier ERR outputs a voltage signal at high level to turn on the second switch Q2 so that the system terminal VSYS can receive power from both of the switching charger 10 and the first bypass charging circuit 20. It should be noted that, at this time, the fast charging circuit temporarily stops charging the battery BAT.

When the current provided by the switching charger 10 to the system terminal VSYS has been raised as required by the load at the system terminal VSYS, the first voltage V1 will be higher than or equal to the reference voltage VREF. At this time, the error amplifier ERR stops outputting the voltage signal at high level so that the second switch Q2 is turned off. In response, the battery BAT is still charged by the switching charger 10 if the battery BAT was originally charged by the switching charger 10 (i.e. the battery was in the switch charging mode), or the battery BAT is still charged by the first bypass charging circuit 20 if the battery BAT was originally charged by the first bypass charging circuit 20 (i.e. the battery was in the fast charging mode).

Due to the second bypass charging circuit 30, the first bypass charging circuit 20 not only contributes to the charging of the battery BAT in the fast charging mode (i.e. charging the battery BAT at a fast speed) but also contributes to the current required by the load at the system terminal VSYS in the switch charging mode (i.e. providing the high current required by the load at the system terminal VSYS together with the switching charger 10). In brief, since the fast charging circuit provided by this embodiment has the second bypass charging circuit 30, when a high current is required by a load at the system terminal VSYS, this high current can be temporarily provided by the input voltage VBUS directly without consuming the voltage VBAT of the battery BAT. Therefore, the charging time of the battery BAT will not be prolonged when a high current is suddenly required by the load at the system terminal VSYS.

Figure 4:
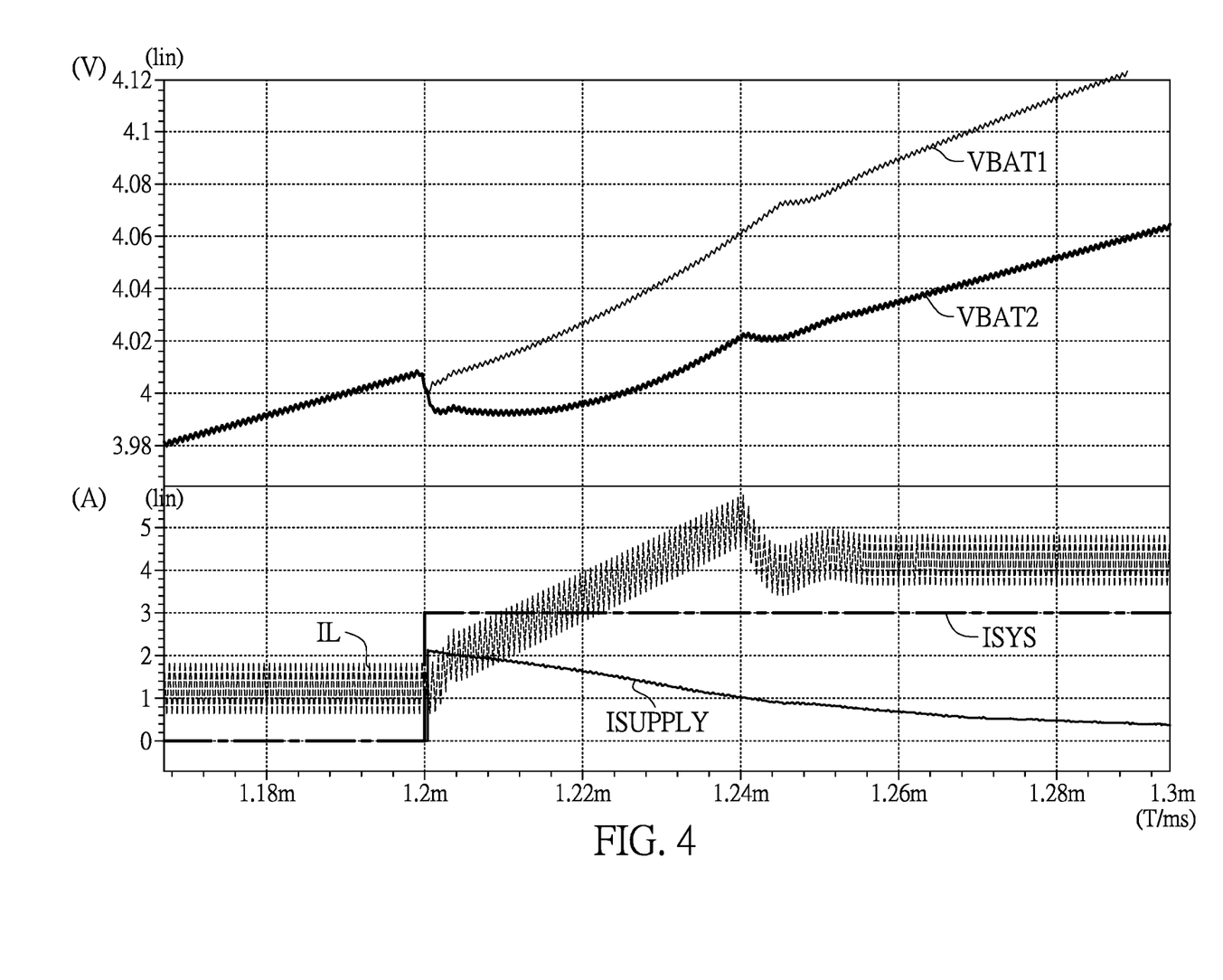
FIG. 4 is a waveform diagram showing how a fast charging circuit works according to one embodiment of the present disclosure.
Figure 5A:
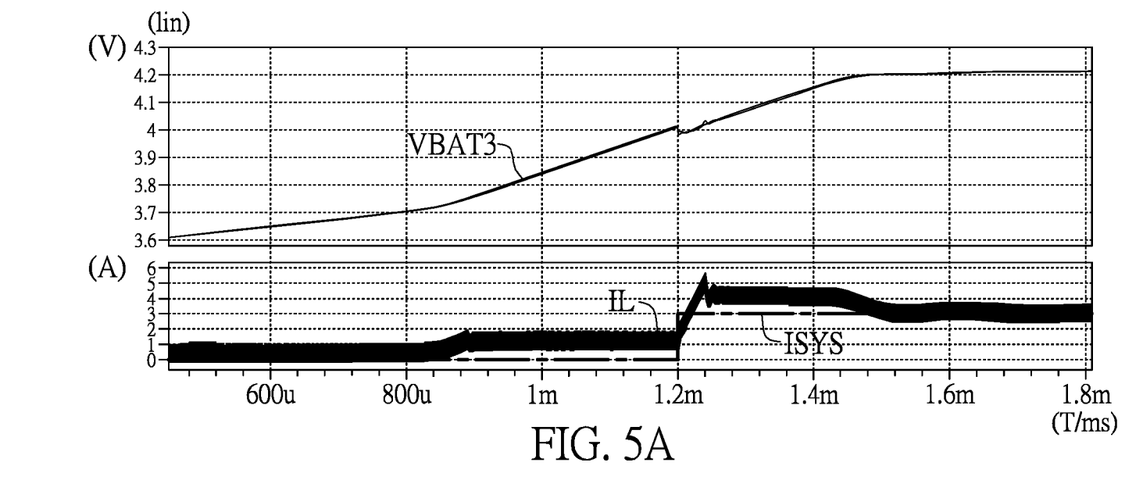
FIG. 5A and FIG. 5B are also waveform diagrams showing how a fast charging circuit works according to one embodiment of the present disclosure.
Figure 5B:
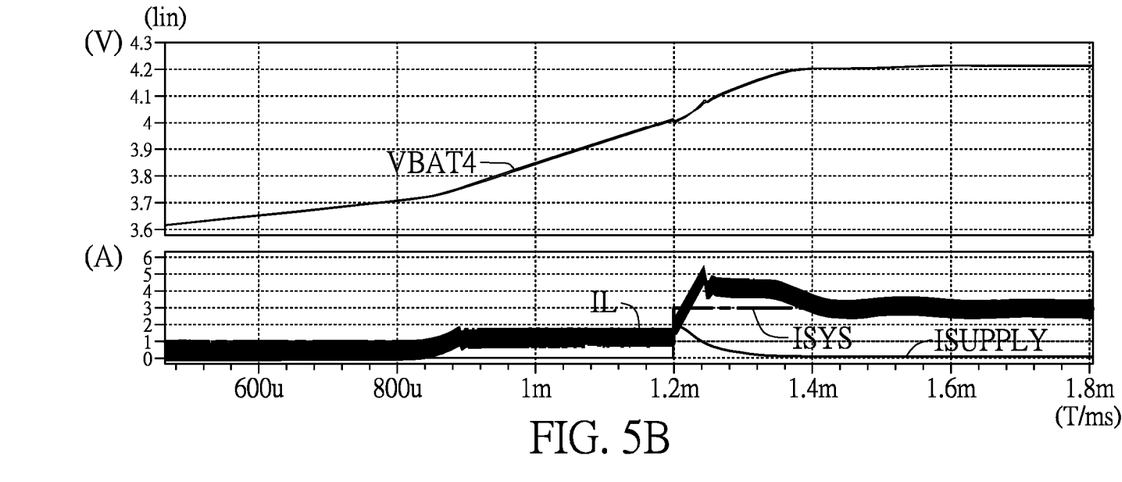

FIG. 4 is a waveform diagram showing how a fast charging circuit works according to one embodiment of the present disclosure, and FIG. 5A and FIG. 5B are also waveform diagrams showing how a fast charging circuit works according to one embodiment of the present disclosure.

As shown in FIG. 4, a curve VBAT1 represents the voltage VBAT of the battery BAT when the fast charging circuit provided by this embodiment works, a curve VBAT2 represents the voltage VBAT of the battery BAT when a conventional charging circuit works, and a current ISYS represents the current required by a load at the system terminal VSYS. According to FIG. 4, when a high current is suddenly required by a load at the system terminal VSYS, the curve VBAT1 drops only slightly and then continues to rise. This is because the second bypass charging circuit 30 outputs a voltage signal at high level to turn on the second switch Q2 and thus provides a current ISUPPLY. However, when a high current is suddenly required by a load at the system terminal VSYS, the curve VBAT2 drops considerably and then continues to rise. This is because the battery BAT itself contributes a current required by the load at the system terminal VSYS.

Accordingly, for the fast charging circuit provided by this embodiment, a high current suddenly required by a load at the system terminal VSYS can be directly provided by the input voltage VBUS without consuming the voltage VBAT of the battery BAT. Therefore, the charging time of the battery BAT will not thus be prolonged. On the contrary, for a conventional charging circuit, the charging time of the battery BAT will be prolonged because the battery BAT needs to provide the high current required by the load at the system terminal VSYS.

In FIG. 5A and FIG. 5B. a curve VBAT3 represents the voltage VBAT of the battery BAT when a conventional charging circuit works, a curve VBAT4 represents the voltage VBAT of the battery BAT when the fast charging circuit provided by this embodiment works, and a current ISYS represents a current required by a load at the system terminal VSYS. According to FIG. 5B, for the fast charging circuit provided by this embodiment, without consuming the voltage VBAT of the battery BAT, a high current suddenly required by a load at the system terminal VSYS can be provided by an inductor current IL from the switching charger 10 and a current ISUPPLY provided by the first bypass charging circuit 20. Thus, the charging time of the battery BAT shown in FIG. 5B is shorter than the charging time of the battery BAT shown in FIG. 5A.

Referring to FIG. 5A and FIG. 5b, if there is a current required by a load at the system terminal VSYS during the charging process, the conventional charging circuit would take roughly 1.5 ms to charge the battery to its full battery voltage, but the fast charging circuit provided by this embodiment only takes roughly 1.38 ms to charge the battery to its full battery voltage.

[Still another embodiment of the fast charging circuit]

Figure 3:
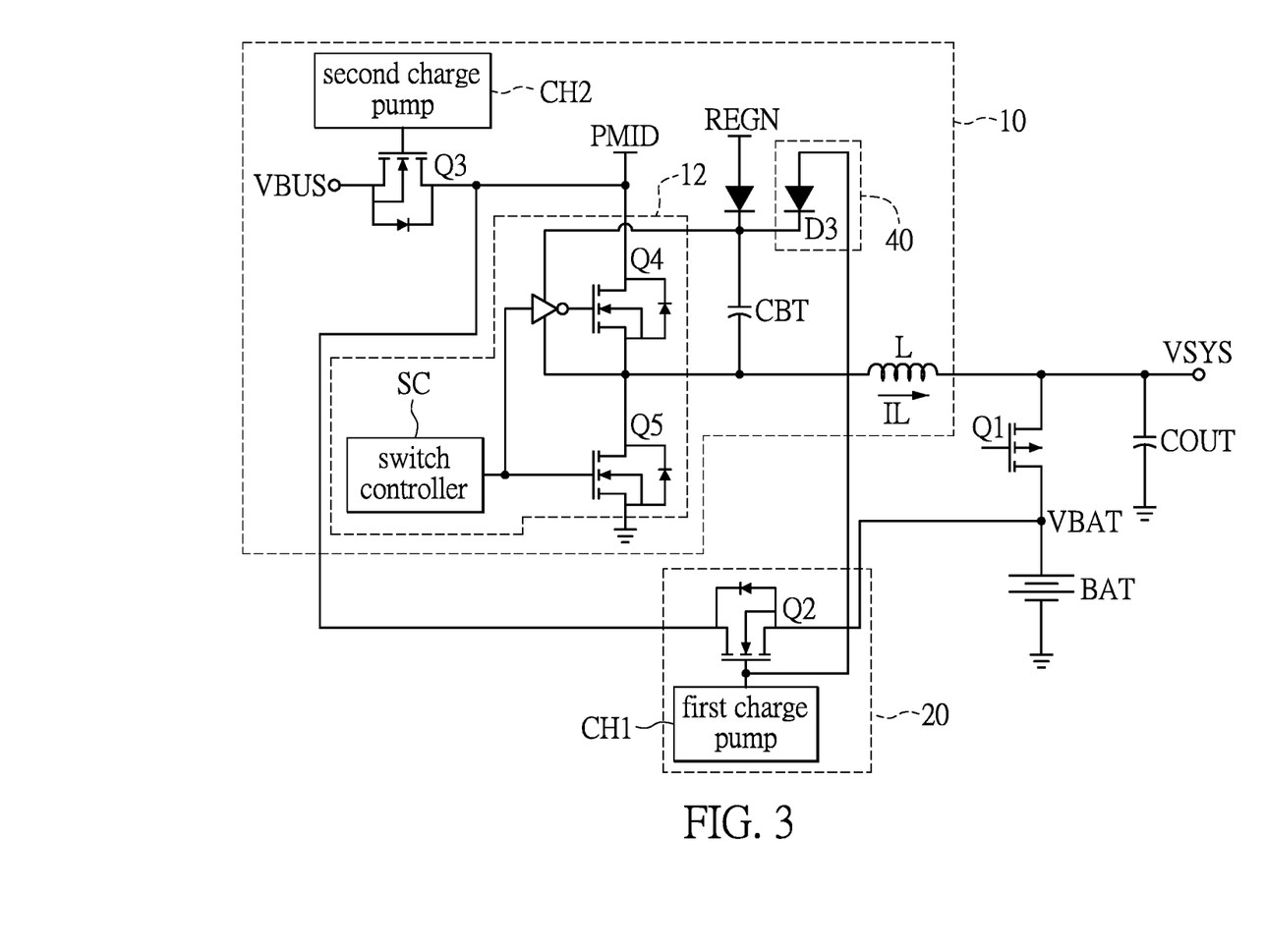
FIG. 3 shows a circuit diagram of a fast charging circuit according to still another embodiment of the present disclosure.

Referring to FIG. 3, a circuit diagram of a fast charging circuit according to still another embodiment of the present disclosure is shown.

The fast charging circuit provided by this embodiment and the fast charging circuit shown in FIG. 1 have similar circuit configurations and working principles. Thus, the major circuit configuration and working principle of the fast charging circuit provided by this embodiment can be referred to in the previous embodiments, and in the following descriptions, only differences between them are described.

The major difference between the fast charging circuit provided by this embodiment and the fast charging circuit shown in FIG. 1 is that, the fast charging circuit provided by this embodiment further includes a third bypass charging circuit 40. As shown in FIG. 3, the third bypass charging circuit 40 includes a third diode D3. The anode of the third diode D3 is coupled to the gate of the second switch Q2 and the first charge pump CH1, and the cathode of the third diode D3 is coupled to the gate of the fourth switch Q4.

Similar to the working principle of the fast charging circuit shown in FIG. 1, in this embodiment, when the voltage VBAT of the battery BAT is low, it would not be appropriate to charge the battery BAT with a high current. Thus, when the voltage of the battery is low, the first switch Q1 is turned on and the second switch Q2 is turned off, such that the battery BAT is charged through the switching charger 10, and the system terminal VSYS also receives power from the switching charger 10. On the other hand, when the voltage of the battery is high, the second switch Q2 and the third switch Q3 are turned on, and the switch controller SC is switched off, such that the battery BAT is charged through the first bypass charging circuit 20, and the system terminal VSYS also receives power from the first bypass charging circuit 20.

In addition, when the voltage VBAT of the battery BAT is high (i.e. in the fast charging mode), the first charge pump CH1 turns on the fourth switch Q4 through the third diode D3 so that the system terminal VSYS can receive power from both of the first bypass charging circuit 20 and the switching charger 10.

Due to the third bypass charging circuit 40, the switching charger 10 not only contributes to the charging of the battery BAT in the switch charging mode (i.e. charging the battery BAT by a low current) but also contributes to the current required by the load at the system terminal VSYS in the fast charging mode (i.e. providing the current required by the load at the system terminal VSYS together with the first bypass charging circuit 20).

To sum up, in the fast charging circuit of the present disclosure, compared with the conventional switching charger, the first bypass charging circuit has less impedance. Thus, a high current can be provided through the first bypass charging circuit with less power loss in the fast charging mode, and the fast charging circuit of the present disclosure can have a better charging efficiency.

In addition, for the fast charging circuit of the present disclosure, a high current suddenly required by a load at the system terminal can be provided by the switching charger, the first bypass charging circuit and the second bypass charging circuit. Thus, the voltage of the battery will not drop and the charging time of the battery will not be prolonged.

Moreover, in the fast charging circuit of the present disclosure, the switching charger not only contributes to the charging of the battery in the switch charging mode (i.e. charging the battery by a low current), but also contributes to the current required by the load at the system terminal in the fast charging mode (i.e. providing the current required by the load at the system terminal together with the first bypass charging circuit).

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A fast charging circuit, comprising:
a switching charger, having an input end and an output end, wherein the input end of the switching charger receives an input voltage, and the output end of the switching charger is coupled to a battery through a first switch and is coupled to a system terminal; and
a first bypass charging circuit, having an input end and an output end, including a second switch between the input end and the output end of the first bypass charging circuit, wherein the input end of the first bypass charging circuit receives the input voltage, and the output end of the first bypass charging circuit is coupled to the system terminal through the first switch and is coupled to the battery;
wherein when the voltage of the battery is low, the first switch is turned on and the second switch is turned off such that the battery is charged through the switching charger, and the system terminal receives power from the switching charger, but when the voltage of the battery is high, the second switch and the third switch are turned on such that the battery is charged through the first bypass charging circuit and the system terminal receives power from the first bypass charging circuit.

2. The fast charging circuit according to claim 1, wherein the switching charger at least includes:
a third switch; and
a switching circuit, connected to the input end of the switching charger through the third switch to receive the input voltage, and providing an output voltage to the battery and the system terminal through an inductor.

3. The fast charging circuit according to claim 2,
wherein the first switch is a PMOS transistor, the source of the PMOS transistor is coupled to the system terminal, the drain of the PMOS transistor is coupled to the battery, and the gate of the PMOS transistor receives a control voltage;
wherein the second switch is an NMOS transistor, the source of the NMOS transistor is coupled to the battery, the drain of the NMOS transistor is coupled to the input voltage through the third switch, and the gate of the NMOS transistor is coupled to a first charge pump.

4. The fast charging circuit according to claim 2, wherein the third switch is an NMOS transistor, the source of the NMOS transistor receives the input voltage, the drain of the NMOS transistor is coupled to the input end of the first bypass charging circuit, and the gate of the NMOS transistor is coupled to a second charge pump.

5. The fast charging circuit according to claim 3, wherein the switching circuit includes:
a fourth switch and a fifth switch, wherein the first end of the fourth switch is coupled to the input end of the switching charger through the third switch, the second end of the fourth switch is coupled to the first end of the fifth switch and is coupled to the output end of the switching charger through the inductor, and the second end of the fifth transistor is grounded; and
a switch controller, coupled to the third end of the fourth switch and the third end of the fifth switch.

6. The fast charging circuit according to claim 5, wherein the fourth switch and the fifth switch are NMOS transistors, the first ends of the fourth switch and the fifth switch are drains, the second ends of the fourth switch and the fifth switch are sources, and the third ends of the fourth switch and the fifth switch are gates.

7. The fast charging circuit according to claim 3, further comprising:

a second bypass charging circuit, including:
   an error amplifier, wherein the non-inverting input end of the error amplifier receives a reference voltage, and the inverting input end of the error amplifier is coupled to the system terminal through a voltage dividing circuit; and
   a first diode and a second diode, the anode of the first diode is coupled to the output end of the error amplifier, the anode of the second diode is coupled to the first charge pump, and the cathodes of the first diode and the second diode are coupled to the gate of the second switch.

8. The fast charging circuit according to claim 7,
wherein the error amplifier obtains a first voltage through the voltage dividing circuit, the error amplifier outputs a voltage signal at high level to turn on the second switch when the first voltage is lower than the reference voltage, such that the system terminal receives power from the switching charger and the first bypass charging circuit, but the error amplifier stops outputting the voltage signal at high level when the first voltage is higher than or equal to the reference voltage;
wherein the first voltage is relevant to the voltage of the system terminal.

9. The fast charging circuit according to claim 6, further comprising:
   a third bypass charging circuit, including a third diode, wherein the anode of the third diode is coupled to the gate of the second switch and the first charge pump.

10. The fast charging circuit according to claim 9, wherein the first charge pump turns on the fourth switch through the third diode, such that the battery is charged through the first bypass charging circuit, and the system terminal receives power from the first bypass charging circuit and the switching charger.

* * * * *